July 7, 1936. E. F. WESTON 2,046,665
EXPOSURE METER
Filed May 19, 1933
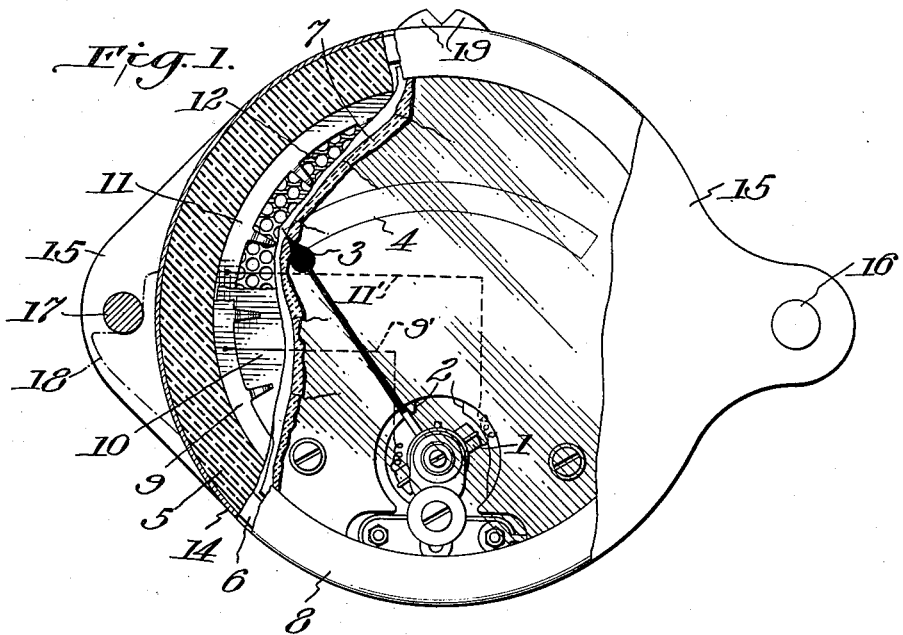
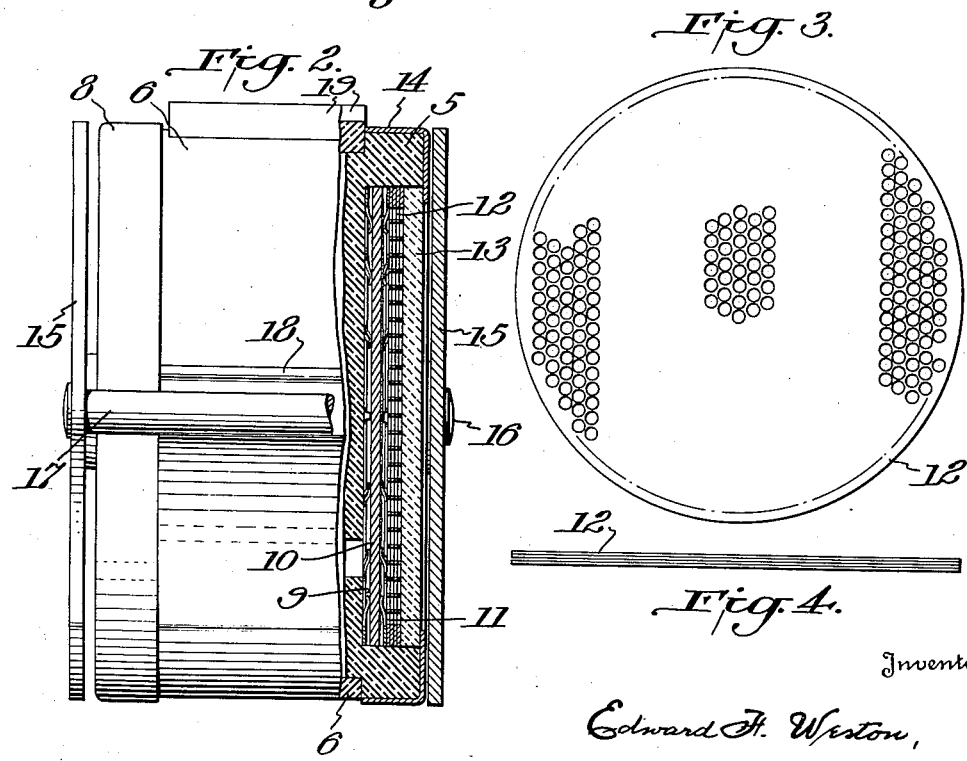
Inventor:
Edward F. Weston,
By Byrnes, Townsend & Potter,
Attorneys.

Patented July 7, 1936

2,046,665

UNITED STATES PATENT OFFICE 2,046,665

EXPOSURE METER

Edward F. Weston, Elizabeth, N. J., assignor to Weston Electrical Instrument Corporation, Newark, N. J., a corporation of New Jersey Application May 19, 1933, Serial No. 671,933

10 Claims. (Cl. 88—23)

This invention relates to an exposure meter and more particularly to an exposure meter of the type including a sensitive electrical measuring instrument, a photoelectric cell and a baffle arrangement for restricting the light rays incident upon the cell substantially to the rays which reach the sensitive plate or film.

Various arrangements of measuring instruments, photoelectric cells and light restricting systems have been proposed but the prior devices have been open to the serious objection that the assembly or complete exposure meter was of relatively large size. A definite limit as to minimum size is set by the electrical measuring instrument, but the previously suggested arrangements of lenses, shield tubes or intersecting louvres for restricting the "cone" or active beam of light rays have resulted in assemblies which were of substantially greater size than the short cylindrical casing commonly employed to house an electrical measuring instrument.

An object of the present invention is to provide an exposure meter of the photoelectric type in which all of the parts may be mounted within a casing not substantially larger than that required by the measuring instrument of the assembly. An object is to provide an exposure meter including a baffle system of multicellular form and in which the baffle system does not add to the size requirements set by the electrical elements of the assembly. An object is to provide an exposure meter including a known type of sensitive electrical measuring instrument, a current-generating photoelectric cell and a reticular plate baffle overlying the cell, both the cell and baffle being located within the base of the measuring instrument. More particularly, an object is to provide an exposure meter including a baffle in the form of a thin plate having a multitude of small holes of a width of about the order of the thickness of the plate.

These and other objects and advantages of the invention will be apparent from the following specification when taken with the accompanying drawing in which, Fig. 1 is an enlarged elevation of the front face of an embodiment of the invention, and with parts broken away for the better illustration of the baffle system and the photoelectric cell;

Fig. 2 is a side elevation, with the rear portion of the device shown substantially in central section; and Figs. 3 and 4 are, respectively, a front elevation and side view of the baffle member.

The electrical measuring instrument which forms the major portion of the exposure meter, at least so far as bulk is concerned, may be of the general form described in the Weston and Carpenter patent, No. 1,635,595, granted July 12, 1927, and includes a moving coil 1 which is pivotally supported between the opposed pole pieces 2 of a permanent magnet, the pointer 3 being secured to the coil 1 and moved by it over a scale 4 in response to current flow in the coil. The magnet, moving coil and scale are supported upon the base 5 of the instrument, the base being preferably a molded insulating material such as a synthetic resin. As illustrated, the instrument parts are housed within a short cylindrical casing formed by the base 5 and a cylindrical wall 6 of insulating material, the front end of the wall portion 6 being closed by a glass plate 7 which is held in place by the ring 8. As is usual in the design of electrical measuring instruments, the axis of the cylindrical casing is parallel to the pivotal axis of the moving system.

In accordance with the invention, the photoelectric cell and focusing baffle are both located within the base 5, but the thickness of the base, and of the complete assembly, is not appreciably increased by this arrangement. The rear face of the base 5 is provided with a circular recess in which are seated, progressively from the bottom of the recess, the back contact ring 9, the photoelectric cell 10, and the front contact ring 11. The photoelectric cell is of the barrier layer or current-generating type such as is commonly designated as a "solid disk cell". As best shown in Fig. 1, the contact rings have a plurality of slightly bent resilient contact fingers which engage the opposite faces of the cell, and the rings are connected to the opposite terminals of the moving coil by appropriate leads which are indicated diagrammatically by the connection lines 9', 11'. The cell 10 comprises a solid, multilayer disk which is normal to the axes of the instrument casing and the moving system, and a focusing system or baffle is arranged between the cell and the adjacent end of the casing to restrict the active beam of light rays approximately to a cone, or frustrum of a cone, having an axis parallel to the axis of the instrument casing.

The baffle member 12 overlies the cell and its connecting rings, and comprises a fabricated reticular member having a multitude of small openings which are preferably spaced as closely as permitted by the mechanical strength of the material. The rear glass or coverplate 13 rests against the baffle 12, and the several parts within the recess of base 5 are retained in place by the binding ring or flange 14 which has an inner edge extending slightly over the glass 13.

In view of the small size and close spacing of the openings, the baffle plate 12 comprises a plurality of very thin metal sheets, as illustrated in Figs. 2 and 4, to permit punching in place of the more expensive drilling of the openings. Sheets of brass may be accurately punched and then superposed to form the baffle plate, the sheets being blackened after punching to prevent reflection of light from the surfaces of the metal.

The device is preferably provided with a protective cover consisting of plates 15 which are pivoted to the instrument casing by a pin 16, and are joined by a pin 17 which engages within an undercut seat 18, formed by a projecting lug on the cylindrical wall 6, to yieldingly retain the cover in closed position. The upper portion of the casing is provided with ribs 19 which form a sighting notch for facilitating the accurate directing of the rear face of the exposure meter towards the particular view which is to be photographed.

The advantages of the construction will be apparent from a statement of the dimensions of one practical embodiment, but it is to be understood that the invention is not limited to any particular size. An exposure meter substantially as illustrated has been produced commercially in the extremely small thickness of 1½ inches, with a length and height, as viewed in Fig. 1, of about 3 and 2⅓ inches, respectively, the total weight being about 6 ounces. This overall size could be reduced somewhat by omitting the protective cover which is not an essential part of the exposure meter but, in general, it will be both convenient and desirable to provide either a protective cover or a carrying case, neither of which will add materially to the overall dimensions of the short cylindrical assembly. In this particular design, four sheets of brass were employed to make a baffle plate having a total thickness of 0.08 inches, and the entire active face of the baffle was perforated with holes of 0.05 inches in diameter, the holes in adjacent rows being staggered, as shown in Fig. 3, the spacing between adjacent rows being 0.06 inches and the spacing of the holes in a row being only 0.052 inches. In spite of the extreme thinness of the baffle member, a true focusing action was obtained which restricted the angular spread of the active beam of light substantially to that which will be effective in the photographic reproduction of the scene.

The total thickness of the photoelectric cell, the baffle and glass plate was slightly less than ¼ inch, and therefore the location of these elements in the insulating base 5 did not necessitate any increase in the thickness of the measuring instrument. This dimension is measured along the axis of the cylindrical casing and it is to be noted that the thickness is substantially less than the diameter of the casing. This relationship is in marked contrast to the geometry of the exposure meters previously proposed, as the general form of the older devices was that of an elongated tube, the length of the casing being several times the diameter. As a matter of fact, the overall size is less than that of a standard measuring instrument since the external terminal posts are omitted and the circuit connections are all within the instrument casing.

While I have described the form of focusing system which is now preferred, it will be apparent that other methods may be employed to restrict the beam of light rays without substantially increasing the size of the assembly. For example, a multicellular baffle could be prepared by welding alternately arranged plane and corrugated ribbons or metal strips to form a thin composite plate. Whether incorporated in an instrument of the type and size noted above, or in instruments of other designs and sizes, the invention provides a practical means for reducing the size of the complete exposure meter to a minimum. For convenience of description, and in view of its most important use, the complete assembly has been described as an "exposure meter", but it will be apparent that the device may be employed for measuring the brightness of any scene or object, whether or not the information thus obtained is used to determine data for the correct exposure of a photographic plate or film.

I claim:

1. An exposure meter comprising an electrical measuring instrument having a permanent magnet and a pivotally mounted coil, a casing enclosing said instrument, said casing including a peripheral wall closely surrounding said magnet and a base section supporting said magnet and coil, a current-generating cell of the solid disk type within said casing and supported by said base section, electrical connections between the said cell and coil, and a baffle comprising a thin plate of reticular form extending transversely to said peripheral wall and positioned within said casing adjacent to said cell for limiting the angular spread of light rays which impinge upon said cell.

2. An exposure meter as claimed in claim 1, wherein the openings in the said thin plate have a size not substantially in excess of the thickness of the plate.

3. An exposure meter as claimed in claim 1, wherein said thin plate comprises a plurality of thin metal sheets having alined apertures therethrough.

4. In an exposure meter, the combination with an electrical measuring instrument having a base supporting a pivotally mounted movable system, and means cooperating with said base to define a casing for said instrument, of a photoelectric cell and a baffle therefor located within said instrument casing, the rear face of said instrument base being recessed to provide a space within which said cell and baffle are located.

5. In an exposure meter, the combination with an electrical measuring instrument comprising a moving system mounted on a base, and a casing secured to the base and enclosing the moving system, of a photoelectric cell within said casing and supported by said instrument base, a recticular plate overlying said cell, and a glass coverplate overlying said plate, said instrument casing including a retaining ring extending over the edge of said coverplate to secure the same and also said baffle plate and cell upon said base.

6. An exposure meter as claimed in claim 5, wherein said reticular plate consists of a plurality of superposed thin sheets having alined perforations.

7. An exposure meter as claimed in claim 5, in combination with cover plates at the front and rear of said instrument casing, and means pivotally supporting said cover plates on said casing.

8. In an exposure meter, the combination with an electrical measuring instrument and a photoelectric cell, of means for restricting the light reaching said cell substantially to those rays which are included within the image angle of a camera, said means comprising a punched plate of reticular form adjacent said cell.

9. An exposure meter as claimed in claim 8, wherein the openings in said plate have a size of an order not substantially in excess of the thickness of the plate.

10. In an exposure meter, the combination of an electrical measuring instrument, a photoelectric cell connected to said instrument, and means for restricting the light reaching said cell substantially to those rays which are included in the image angle of a camera, said means comprising a plurality of superposed sheets each having closely spaced openings therethrough, the openings of the said sheets being alined.

EDWARD F. WESTON.